Figure 1:
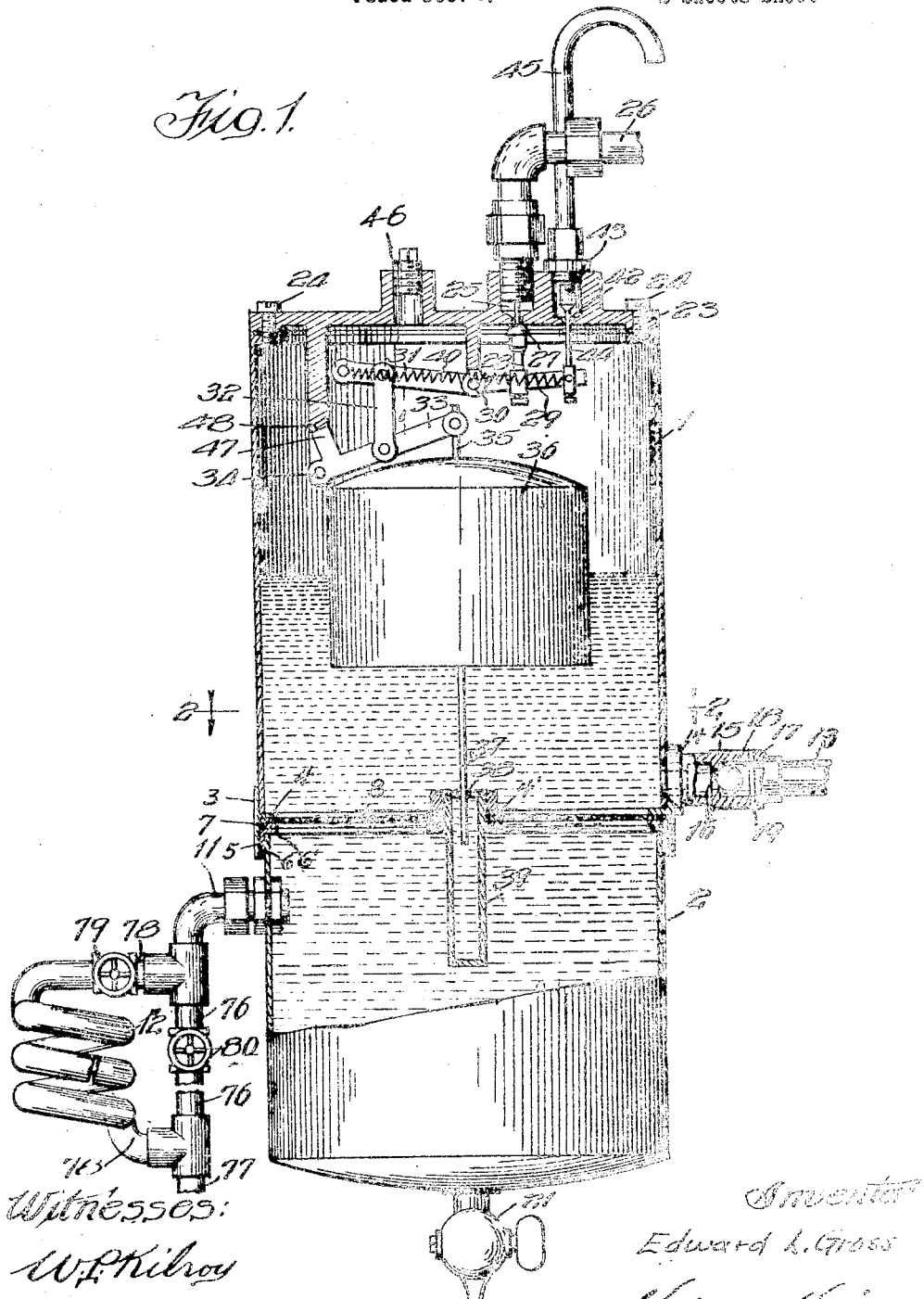

Aug. 28, 1928.

E. L. GROSS 1,681,930

APPARATUS FOR PURIFYING USED LUBRICATING OIL

Filed Dec. 3, 1919    2 Sheets-Sheet 1

Witnesses:
W. P. Kilroy
Harry L. White

Inventor
Edward L. Gross
By

Aug. 28, 1928.
E. L. GROSS
1,681,980
APPARATUS FOR PURIFYING USED LUBRICATING OIL
Filed Dec. 3, 1919    2 Sheets-Sheet 2
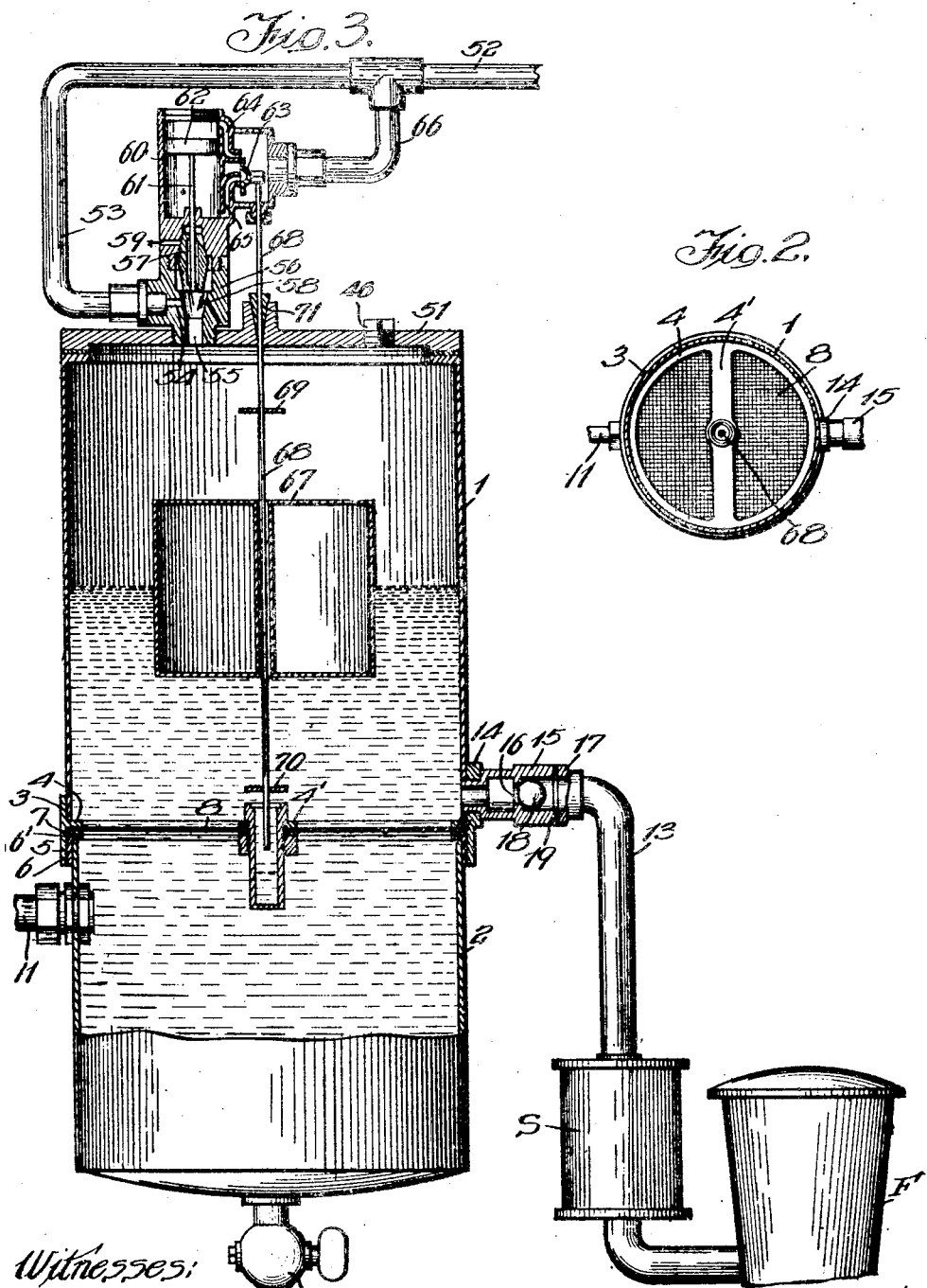
Witnesses:
W. F. Kilroy
Harry R. White
Inventor
Edward L. Gross Patented Aug. 28, 1928.

1,681,980

UNITED STATES PATENT OFFICE.

EDWARD L. GROSS, OF CHICAGO, ILLINOIS.

APPARATUS FOR PURIFYING USED LUBRICATING OIL.

Application filed December 3, 1919. Serial No. 342,197.

My invention belongs to that general class of devices known as oil purifiers or filters and relates particularly to a device of the kind described, applicable for the purification of the oil employed for the lubricating of internal combustion engines. The device is particularly desirable for use on automobile engines as it can be installed under the hood of an automobile, and it will, while the automobile engine is in operation, intermittently draw the dirty oil from the bottom of the crank case, free this oil from gasoline, water and all suspended matter, such as carbon or small metallic particles, and return it to the upper part of the crank case through the usual oil filler opening in a clean filtered condition and free from water.

In the modern automobile the lubricating oil is placed in the engine crank case where portions are usually drawn out by a small pump, or otherwise forced to the various engine bearings, from which the oil returns by gravity. The oil is also violently agitated and splashed by the circular movement of the crank shaft for lubricating the main bearings and pistons. Being subjected to the high temperature of the engine and being used over and over again, the oil gradually becomes contaminated with sediment resulting from the carbonizing of the oil, metallic particles worn off from the moving parts, as well as from material which originally entered with the oil or which finds its way into the crank case.

During the combustion of the gasoline in the engine cylinder, water vapor is produced which partially condenses and with gasoline, kerosene, or the like, may escape past the piston rings, thus entering the oil in the crank case and interfering considerably with the lubricating efficiency of the oil. In the same manner some of the lower boiling portions of the gasoline employed escape past the rings and contaminate the oil. On account of this contamination and deterioration of the oil, it is necessary at frequent intervals to withdraw the entire contents of the crank case and thoroughly wash out the crank case replacing the old oil with a fresh supply. This naturally entails expense in time and labor, as well as causing a frequent loss of a considerable amount of oil. In addition the engine operates between cleanings with an oil which gradually accumulates dirty suspended matter and grit resulting in wear of the bearings, piston rings, etc., causing a depreciation in value of the automobile.

The present invention has among its objects the production of a device of the kind described, that is simple, convenient, durable, compact, efficient and satisfactory for use wherever found applicable. It has particularly as a further object the production of a device of the kind described, which will maintain the lubricating oil constantly in a pure and clear condition and provide a means for removal of gasoline and water and will maintain the oil at a lower temperature, thus preventing considerable loss due to evaporation. Many other objects and advantages of the construction herein shown and described will be obvious to those skilled in the art, from the disclosure herein given.

To this end my invention consists of the novel construction, arrangement and combination of parts herein shown and described and more particularly pointed out in the claim.

In the drawings, wherein like reference characters indicate like or corresponding parts, Fig. 1 is a vertical sectional view through one form of my device, Fig. 2 is a horizontal sectional view taken substantially on line 2—2 of Fig. 1, and Fig. 3 is a vertical sectional view of a slightly modified construction.

Referring to the drawings, particularly Fig. 1, I provide a small tank divided into chambers by means of a filtering medium through which the oil passes. As shown, the tank consists of parts 1 and 2 suitably secured together, preferably so that one of the parts may be conveniently removed from the other for convenience in replacing the filter and for cleaning. In the type of apparatus shown, I provide a collar 3 on one part which is preferably inwardly flanged as at 4, and which carries a cross bar 4' extending through the center, it being understood that this may be modified as desired. The part 3 is formed with a depending flange 5 threaded on the interior to engage a part 6 which is secured to part 2. The part 6 is exteriorly threaded to screw into flange 5 and is preferably provided with a radially inwardly extending flange 6'. A washer 7 is arranged between the two flanges 4 and 6' and also the screen or filtering medium 8 of fine mesh wire, cloth, or the equivalent, which will strain and filter the material passing from the chamber in part 1. The device is provided with an inlet pipe 11 connected with chamber 2, which pipe is usually connected to the crank case adjacent the bottom so as to take oil therefrom. If desired the same may be arranged in the form of a coil 12, which coil may be suitably heated, preferably by being given a few turns around the exhaust manifold or pipe. However, after the engine has been running, the oil usually is hot. The device is also provided with a discharge pipe 13 which, in the construction shown, is connected with the chamber in the part 1. I have shown a part 14 arranged on the part 1, the same being formed for connection with a part 15 within which is arranged a check valve 18 for controlling the passage of fluid through the opening 16, and 17 is a part for connecting pipe 13 with the part 15. A pin 19 or its equivalent limits the movement of the valve 18. Any standard type of check valve may be employed. The pipe 13 is connected with the crank case in any desired manner; for example, it may be arranged to discharge into the filling receptacle F. I have shown a glass oil cup S arranged between the device and the filler F so that the passage of oil from the purifier to the crank case may be observed.

A drain cock 21 is provided on the casing part 2 so that the same may be drained to remove the sediment which will accumulate. Part 1 is provided with a cover 23, or its equivalent, which may be secured in place by screws 24 or other fastening means. As shown the cover 23 is provided with an outlet or port 25 connecting with a pipe 26. Pipe 26 is connected with the intake manifold, with one of the cylinders, a pump or any equivalent, which will cause a suction and produce a vacuum or partial vacuum in the tank. This part of the device, as well as the mechanism for controlling the operation of the device is similar to a well known type of gasoline vacuum feed. As shown, port 25 is controlled by a valve 27 having the stem 28 connected with an arm 29, pivotally supported at 30 within the casing or tank. Arm 31 also pivotally supported at 30 is provided. A spring 40 arranged as shown, resiliently maintains the parts in operative positions. Arm 31 carries a link 32, which is connected with an arm 33, which arm 33 is pivotally supported at 34 and carries a stem 35 upon which is arranged a float 36 the float and the stem being integral. The stem 35 may be extended as at 37 below the float and through a guide 38. A tube 39 closes the opening and prevents the passage of oil to the upper chamber, except through the filtering medium. The device is also provided with an air port 42 arranged to be controlled by a valve 43, having the stem 44 connected with the arm 29. 45 is an air vent pipe and 46 a plug. Arm 33 is shown with an extension 47 arranged to cooperate with a shoulder 48 and limit the upward movement of the float.

The suction of the pistons in the internal combustion engine creates a vacuum which transferred to the upper chamber through the pipe 26. This vacuum causes the check valve 18 to be closed and also sucks up the oil from the lower part of the crank case through the pipe 11. The oil passes into the lower chamber and is drawn up through the filtering medium 8, entering the upper chamber in a clean gritless condition. All dirt stopped by the filtering may settle by gravity to the bottom of the device. As the oil rises in the upper chamber it causes the float 36 to rise and when the float reaches a pre-determined point, it causes movement of valves 27 and 43 so as to shut off the suction in 26 and simultaneously admits air through pipe 45 to part 1. This admission of outside air destroys the vacuum, thus causing the check valve 18 to open, permitting the clean oil to flow out through the pipe 13 into the glass oil cup S and through the oil filler F into the crank case. In Figure 1, I have shown the pipe 11 extended as at 76 and 77 with the coil 12 connected thereto by the pipes 78, valves 79 and 80 being provided for controlling the passage of oil from the crank case to the purifier. When it is desired to heat the oil in addition to the heat derived from the engine itself, valve 80 is closed and valve 79 opened so that the oil passes through the coil 12 which, as mentioned before, may be heated from the exhaust manifold. Usually in the summer time the coil may be cut out of the heating system by opening valve 80 and closing valve 79, while in the winter time or cool weather, the coil may be employed.

After the oil level is thus fallen in the upper chamber to a predetermined level, the float valve again operates the suction valve 27 and air valve 43, thereby opening connection to the intake manifold and closing the opening from the atmosphere. This again causes suction in the upper chamber and the operation is periodically repeated. The lower chamber may be drained, as required, to remove sediment and water which may collect at the bottom, or the lower part of the tank may be removed for this purpose. If the plug 46 is removed, the filtering medium 8 may be cleaned by pouring a small amount of gasoline through the opening, removing all the dirt and sediment at the underside of the filter, the dirty gasoline being drained off, as described.

The construction shown in Fig. 3 is similar, except that in this case the control of the vacuum and admission of air is dependent on a valve 57. Referring to the figure, plate 51 or the cover is provided with a part 56 having a port 55 communicating with the tank. 53 is a pipe connected with the intake manifold, or the equivalent, by means of pipe 52. A port 54 is provided communicating with the port 55. A valve 57 is arranged to cooperate with valve seat 58 in part 56 and control to port 55. Arranged on part 56 is a small cylinder 60 containing a piston or plunger 62 having a rod 61 connected with valve 57. An air port 59 is also provided arranged to be controlled by the valve 57. 63 is a valve member arranged to control ports 64 and 65, the valve chamber being connected by pipe 66 with pipe 52. Valve 63 is controlled by a valve stem 68 upon which is arranged a float member 67 arranged to cooperate with members 69 and 70. The members 69 and 70 are fast on the valve stem 68, while the float 67 is loose with respect thereto and rises and falls with the level of oil in the chamber. I also provide a valve member 71 on the stem 68, which serves to admit atmospheric air to enter chamber 1 when the valve stem is in a raised position and to cut off communication with the atmosphere when the valve stem is in a lowered position. When the parts are in the positions shown in Fig. 3 the upper chamber is open to the suction and consequently oil is drawn into the lower chamber and up into the upper chamber. This causes the float 67 to move upwardly until it engages the member 69. In its further movement it carries the rod 68 upward, thereby moving valve 63 until port 65 is uncovered, whereupon the vacuum in the system draws the plunger or piston 62 downward, shutting off port 54. Air then enters through the valve 71 into the tank, breaking the vacuum and permitting the oil to flow out through pipe 13. As shown in Fig. 3 the downward movement of valve 57 opens port 59 thereby permitting atmospheric air to flow through the port 59, valve 57 and port 55 into the tank, the valve 57 being provided with a longitudinal bore not shown. This channel for admitting air to the tank is operated simultaneously with the operation of valve 71. Both devices may be employed to work together as shown in the figure or either one may be employed alone. As a result the float drops until it engages member 70, and moves valve 63 to the opposite position and uncovering port 64. This causes the valve to be moved into the position shown in Fig. 3, thereby closing the air inlet and opening the device to the suction from the pipe 53, when the operations are repeated.

The boiling point of liquids is lowered by the lowering of the pressure and a considerable amount of whatever gasoline or other volatile low boiling liquid with which the oil may be contaminated, rapidly vaporizes due to the vacuum produced in the tank by the suction from the manifold, and is drawn off in the form of a vapor and burnt, thus producing power within the engine cylinders. The purifier being installed under the hood is subjected to the cooling action of the fan, so that the hot oil drawn from the crank case and circulated to the tank and piping is returned to the crank case with its temperature greatly reduced. In this way the heat absorbed by the oil from the hot cylinder walls, which are often at or above a temperature of 350 degrees Fahrenheit, is prevented from "breaking down" and evaporating the oil, thus greatly reducing the amount of lubricating oil required per unit of use. The device, therefore, acts as an oil filter, purifier, dehydrator and cooler, prolonging the life of the engine, preventing overheating and saving oil.

Having thus described my invention, it is obvious that various immaterial modifications may be made in the same without departing from the spirit of my invention, hence I do not wish to be understood as limiting myself to the exact construction, arrangement, combination of parts or uses mentioned.

What I claim as new, and desire to secure by Letters Patent, is—

An apparatus for purifying used lubricating oil, having, in combination, a used lubricating oil purifying tank comprising two cylindrical parts arranged end to end and detachably secured together, a filtering member arranged at the juncture to form a pair of chambers, said tank being provided with a used lubricating oil inlet to the lower chamber and a purified lubricating oil outlet and a plurality of ports in the upper wall of the upper chamber, a suction conduit for removing the vapors of contaminating liquids from the used lubricating oil, communicating with one of said last mentioned ports, means in said last mentioned chamber for controlling said ports at predetermined points, whereby a vacuum due to said suction may be periodically formed and broken in said chamber, a check valve controlling said purified oil outlet, and a passage for oil communicating with said used oil inlet.

In testimony whereof, I have hereunto signed my name.

EDWARD L. GROSS.